Sept. 24, 1940.  J. W. WHITE ET AL  2,215,747
BRAKE
Filed May 1, 1939

INVENTOR.
JOHN W. WHITE
BY RUDOLPH A. GOEPFRICH

ATTORNEY.

Patented Sept. 24, 1940

2,215,747

UNITED STATES PATENT OFFICE 2,215,747

BRAKE

John W. White and Rudolph A. Goepfrich, South Bend, Ind., assignors to Bendix Aviation Corporation, South Bend, Ind., a corporation of Delaware Application May 1, 1939, Serial No. 271,037

1 Claim. (Cl. 188—152)

This invention relates to brakes, and is illustrated as embodied in a hydraulically-operated internal expanding automobile brake of the shiftable-anchorage type.

Difficulty is sometimes experienced with hydraulic brakes by reason of heat transfer from the brake drum, which sometimes becomes very highly heated during prolonged braking, to the wheel cylinder. This may heat the liquid in the cylinder enough to cause boiling, forcing the operating liquid back into the supply lines and causing serious trouble due to the substitution of a compressible fluid for a non-compressible one.

An object of the present invention is to shield the wheel cylinder or its equivalent from the braking flange of the drum. Another object is to utilize the shielding means for the anchorage of the brake.

The above and other objects of the invention will be apparent from the following description of the illustrative embodiment shown in the accompanying drawing, in which.

Figure 1:
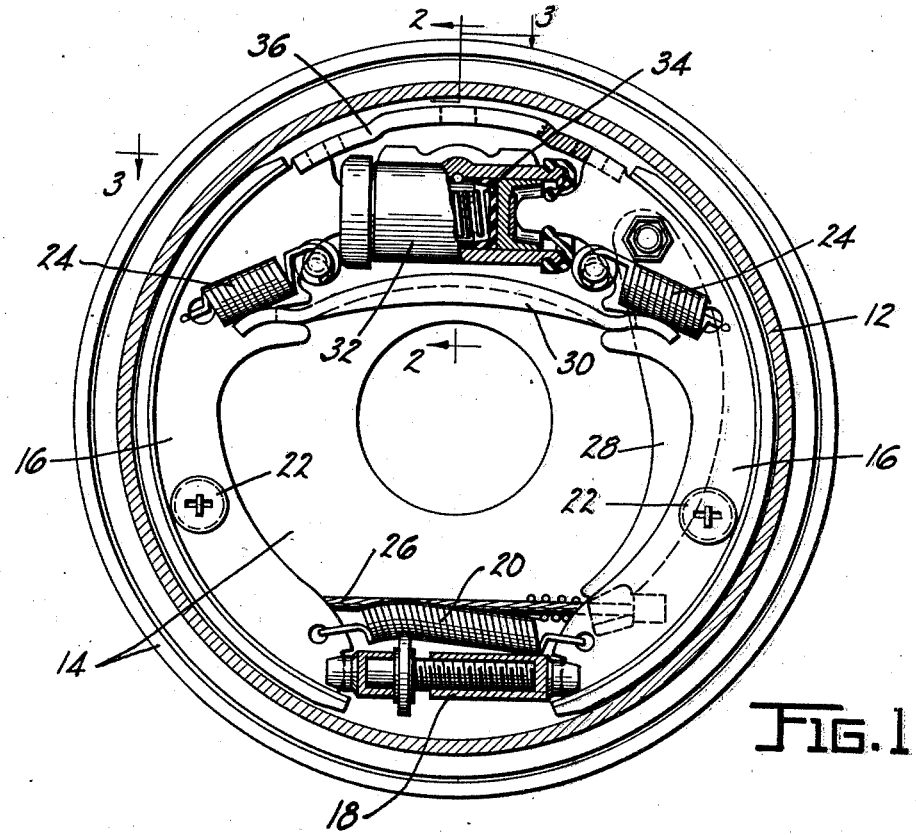
Figure 1 is a vertical section through the brake, in a plane just inside the head of the brake drum, and showing the shoes in side elevation and the wheel cylinder partly in elevation and partly in section.
Figures 2, 3:
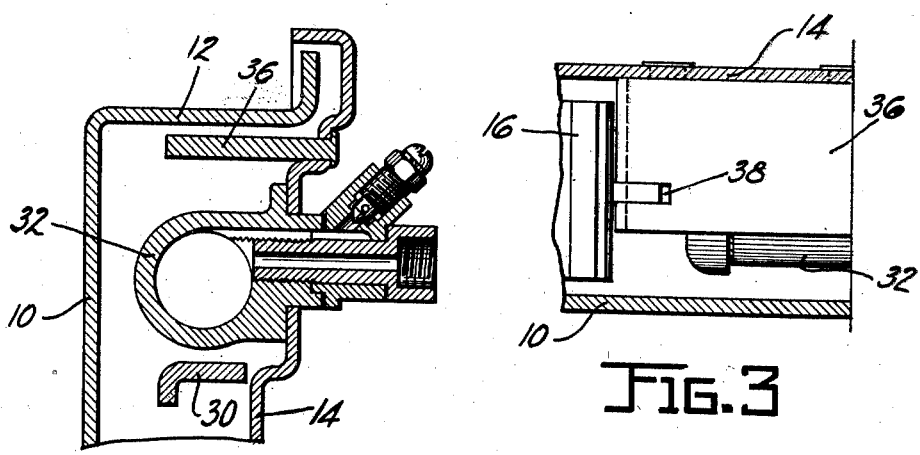
Figure 2 is a partial vertical section on the line 2—2 of Figure 1.
Figure 3 is a partial circumferential section on the line 3—3 of Figure 1.

The illustrated brake includes a brake drum 10 having the usual cylindrical braking flange 12, at the open side of which is a support such as a backing plate 14, and within which is arranged friction means such as a pair of connected shoes 16. The shoes are connected by an adjustable link 18 against which they are held by a spring 20, and are provided with the usual steady rests 22 and return springs 24. For connection by mechanical means to the usual emergency brake lever, when used as an automobile brake, the shoes may be spread apart to cause separation of their upper ends by means such as a Bowden control including a cable 26, connected to operate a lever 28 pivoted on one shoe and acting on the other one through a thrust link 30.

The brake is intended to be applied, for service use, by a hydraulic operating system including a wheel cylinder 32 mounted on the backing plate between the upper ends of the shoes, and which contains pistons 34 acting on the shoe ends to spread them apart when pressure is applied.

The present invention has to do with shielding a hydraulic power device of this character from heat radiated inwardly from the flange 12 when it becomes highly heated during prolonged braking. To this end there is arranged between the cylinder 32 and the flange 12 a shield such as a steel stamping 36 secured to the backing plate 14 and which extends for the full length of the cylinder 32.

We prefer to utilize the shield 36 also as the brake anchorage. To this end it is formed or recessed at its opposite ends with notches 38 which receive and guide the upper ends of the webs of shoes 16. In the operation of the brake, one shoe 16 anchors on the shield 36 during forward braking and the other one anchors thereon during reverse braking; however, the notches 38 are deep enough so that the web of the unanchored shoe remains embraced and guided thereby as the shoe moves out against the drum to apply the brake.

While one illustrative embodiment has been described in detail, it is not my intention to limit the scope of the invention to that particular embodiment, or otherwise than by the terms of the appended claim.

We claim:

A brake comprising, for use with a drum having a generally cylindrical braking flange, a backing plate, friction means mounted on the backing plate and engageable with the inner side of said flange and which has separable ends, a fluid-power device mounted on the backing plate between said ends and operable to force them apart to expand said means against the flange and which is arranged inside the drum adjacent the inner side of said flange, and an anchorage between said ends of the friction means mounted on the backing plate and formed and arranged to extend between said flange and the fluid-power device for the full length of the latter, to screen said device from the heat of said flange during braking, said anchorage being provided with means embracing and guiding the ends of the friction means, said friction means comprising shoes having webs acted on by said fluid-power device and having rims carried by said webs, and said anchorage being a stamped steel shield secured fixedly at its edge to the backing plate and engaged by the ends of said webs.

JOHN W. WHITE.
RUDOLPH A. GOEPFRICH.